United States Patent [19]

Nakashima et al.

[11] Patent Number: 4,652,203
[45] Date of Patent: Mar. 24, 1987

[54] HAND CHANGING DEVICE FOR INDUSTRIAL ROBOTS

[75] Inventors: Seiichiro Nakashima, Hino; Nobutoshi Torii, Hichioji; Masayuki Hamura, Hino, all of Japan

[73] Assignee: Fanuc Ltd., Tokyo, Japan

[21] Appl. No.: 681,417

[22] PCT Filed: Mar. 22, 1984

[86] PCT No.: PCT/JP84/00118
§ 371 Date: Nov. 21, 1984
§ 102(e) Date: Nov. 21, 1984

[87] PCT Pub. No.: WO84/03654
PCT Pub. Date: Sep. 27, 1984

[30] Foreign Application Priority Data

Mar. 22, 1983 [JP] Japan .................... 58-046031

[51] Int. Cl.[4] .......................... B25J 15/04
[52] U.S. Cl. ............................ 414/730; 901/30
[58] Field of Search ............... 414/729, 730, 744 A, 414/751; 901/30, 31, 29; 403/328, 326, 325; 90/27, 28, 130 R, 130 A; 24/453, 603, 607

[56] References Cited

U.S. PATENT DOCUMENTS

| 3,354,787 | 10/1965 | Takamata | 92/130 R |
| 4,281,447 | 8/1981 | Miller et al. | 901/30 X |
| 4,289,414 | 9/1981 | Recker | 403/328 X |

FOREIGN PATENT DOCUMENTS

| 51-24789 | 7/1976 | Japan . | |
| 56-28894 | 3/1981 | Japan . | |
| 543513 | 3/1977 | U.S.S.R. | 901/30 |

Primary Examiner—Terrance L. Siemens
Attorney, Agent, or Firm—Armstrong, Nikaido, Marmelstein & Kubovcik

[57] ABSTRACT

A hand changing device for industrial robots, having a changer body (10) designed to be attached to the robot arm (92) and a changer adapter (50) carrying a robot hand. The changer body (10) and the changer adapter (50) are separate components designed to be coupled detachably. The changer adapter (50) carrying the robot hand (74) is clamped by the changer body (10) by the engagement of a plurality of clamping balls retained within the changer body (10) and a ball engaging part formed in the changer adapter (50). The changer body (10) is provided with a fluid-driven piston (20) to move the clamping balls between two positions, namely, the clamping position and the idle position.

8 Claims, 2 Drawing Figures

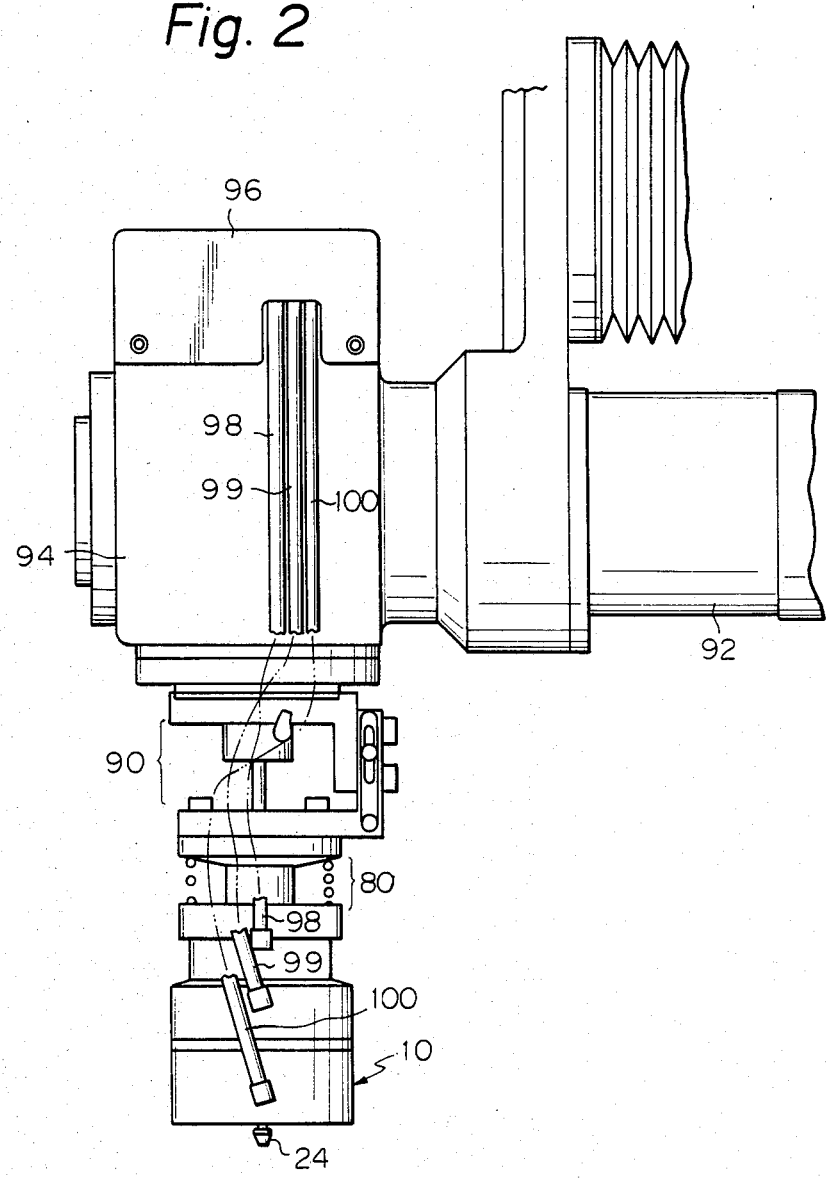

HAND CHANGING DEVICE FOR INDUSTRIAL ROBOTS

DESCRIPTION

1. Technical Field

The present invention relates to an industrial robot and, more particularly, to a hand changing device for industrial robots capable of detachably attaching a robot hand, selected from among various robot hands having different functions, to the free end of the arm of an industrial robot.

2. Background Art

Industrial robots are used widely in combination with machine tools for automatic machining and automatic assembling, and contribute to an improvement of the operational performance and to a reduction of labor. However, most conventional industrial robots are single-purpose robots designed for carrying out a specific work with a robot hand fixedly attached to the extremity of the robot arm. This constitution of conventional industrial robots is one of the factors causing deficient flexibility and versatility in the operational performance of industrial robots. Accordingly, the conventional industrial robot having such a constitution is unable to execute multiple working functions automatically and selectively. In view of such a disadvantage of the conventional industrial robot, there has been proposed an industrial robot having a changeable hand system, in which various kinds of changeable robot hands are prepared beforehand and are attached selectively and individually to the extremity of the robot arm.

DISCLOSURE OF THE INVENTION

Accordingly, it is an object of the present invention to provide a hand changing device, which is necessary for the above-mentioned changeable hand system, in order to enhance the working capability of an industrial robot by enabling various kinds of robot hands of different working functions to be automatically replaced and attached to a single industrial robot.

The present invention provides a hand changing device for industrial robots comprising a changer body mounted on the robot arm of an industrial robot and a changer adapter detachably attachable to the changer body and carrying a robot hand, in which the changer body has a clamping piston, clamping balls which are moved to a clamping position as the clamping piston moves upward and to an unclamping position as the clamping piston moves downward, and spring means which applies upward pressure continuously to the clamping piston. The changer adapter has an engaging part which engages the clamping balls of the changer body and the robot hand is replaced by a robot hand with a different function through the replacement of the changer adapter by another changer adapter.

According to the present invention, various kinds of robot hands are attached beforehand to a plurality of changer adapters respectively in preparation, and therefore the robot hands can be selectively and individually attached to the extremity of the robot arm of a single industrial robot, thereby enabling the industrial robot to carry out various robot work functions under the control of a robot control unit.

BRIEF DESCRIPTION OF THE DRAWINGS

FIG. 2 is a front elevation of the hand changing device of FIG. 1, in which the changer body is attached to the extremity of a robot arm.

BEST MODE FOR CARRYING OUT THE INVENTION

Figure 1:
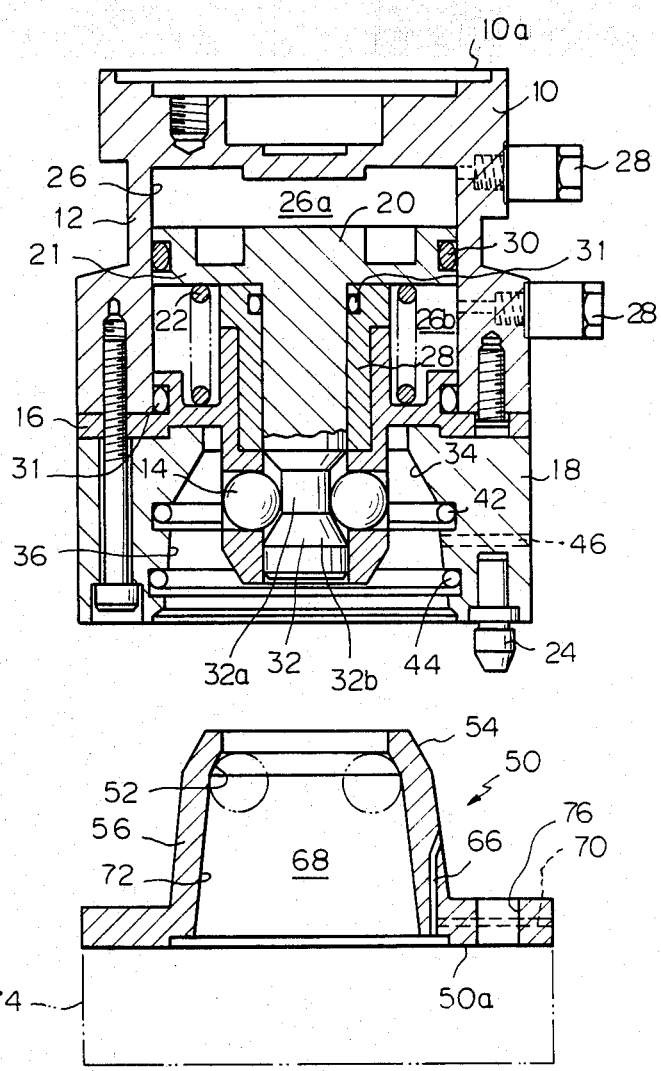
FIG. 1 is a longitudinal sectional view showing the respective constructions of a changer body and a changer adapter forming a hand changing device according to the present invention for industrial robots.

Referring to FIG. 1, a hand changing device includes a changer body 10 designed to be attached to the robot arm of an industrial robot and a changer adapter 50 carrying a robot hand 74. The changer body 10 is designed to be joined detachably at one end face 10a thereof to the robot arm and, in the ordinary operating setup, is fixedly attached to the robot arm by suitable means such as screw bolts. The changer adapter 50 is designed to be connected at the bottom end face 50a thereof to a robot hand 74. A robot hand 74, one of various robot hands having different functions, is attached individually to the changer adapter 50 beforehand by fixing means such as screw bolts. The changer body 10 has a barrel 12 having the above-mentioned end face 10a; a retainer 16 attached to the other end face of the barrel 12 with respect to the end face 10a and retaining clamping balls 14; an annular head 18 fixedly attached to the bottom side of the retainer 16; a piston 20 adapted to move linearly between the barrel 12 and the retainer 16; a spring 22 with one end thereof placed on the retainer 16 and the other end on one surface of the piston 20, so that spring pressure is applied constantly to the piston 20 to urge the piston 20 upward; and a positioning pin 24 attached to the bottom surface of the head 18 and projecting downward from the same bottom surface. The barrel 12 is an annular body having a cylinder chamber 26 receiving the piston 20 therein. The piston 20 is guided for vertical movement by a cylinder liner 28 fixed to the retainer 16 by suitable means. The cylinder chamber 26 is divided into an upper chamber 26a and a lower chamber 26b by the pressure receiving plate 21 of the piston 20. When a pressurized fluid is introduced through an inlet port 28a into the upper chamber 26a, the piston 20 is forced to move downward, as viewed in FIG. 1, from the side of the barrel 12 toward the side of the retainer 16. When the pressurized fluid is introduced through an inlet port 28b into the lower chamber 26b, the piston is forced to move upward, as viewed in FIG. 1, from the side of the retainer 16 toward the side of the barrel 12 by the agency of both the upward pressure of the spring 22 and the pressure of the pressurized fluid. Since the spring 22 applies upward pressure constantly to the piston 20, as mentioned above, the piston 20 is retained at a fixed upper position while the pressurized fluid is introduced neither into the upper chamber 26a nor into the lower chamber 26b. The piston 20 is provided with a piston ring 30 for sealing the gap between the piston and the circular wall of the cylinder chamber 26. The piston ring 30 may be either a metallic ring or an ordinary O-ring. Indicated at 31 are O-rings sealing the gaps between the piston 20 and the cylinder liner 28 and between the retainer 16 and the barrel 12 respectively. A clamping-actuation part 32 is formed in the lower portion of the piston 20. When the piston 20 is moved upward in the cylinder chamber 26, the clamping-actuation part 32 pushes the clamping balls 14 loosely retained by the retainer 16 (usually, three clamping balls are provided at equal intervals on a circumference, however, the number of clamping balls is not limited to three) radially outward so that the clamping balls protrude radially outward from the retainer 16. When the piston 20 is moved downward, the clamping balls 14 are permitted to move inward into the retainer 16. More specifically, the clamping-actuation part 32 is formed of a clamping ball receiving groove 32a for receiving the clamping balls 14 therein and a conical surface 32b expanding downward from the clamping ball receiving groove 32a. When the piston 20 is moved upward, the conical surface 32b causes the clamping balls 14 to protrude radially outward from the retainer 16. As previously mentioned, since the piston 20 is urged constantly upward by the spring 22, the clamping balls 14 are constantly biased radially outward (toward the clamping position) and when the piston 20 is moved downward, the clamping balls 14 are permitted to move back into the retainer 16 to the unclamping position.

Two conical taper surfaces 34 and 36 are formed inside the head 18. Part of the changer adapter 50, which will be described later, fits in the space formed between the taper surfaces 34 and 36 and the retainer 16. Two O-rings 42 and 44 are attached to the upper end and the lower part of the taper surface 36 respectively in sealing contact with the taper surface of the changer adapter 50. When the changer adapter 50 is fitted in the changer body 10, a sealed space is formed between those O-rings 42 and 44. A pressurized fluid inlet port 46 formed in the head 18 opens into the sealed space to introduce a pressurized fluid from outside into the sealed space.

The changer adapter 50 is a hollow annular member having the bottom end face 50a designed as a surface for holding the robot hand 74, as mentioned hereinbefore. The upper portion of the changer adapter 50 is formed so as to be fitted in the changer body 10. The changer adapter 50 has an inner conical taper engaging surface 52 which engages the clamping balls 14 when the changer adapter 50 is fitted in the changer body 10 and an outer conical taper surface 54 which is brought into close contact with the conical taper surface 34 of the head 18 when the changer adapter 50 is fitted in the changer body 10. A conical taper surface 56 having a taper less inclined than that of the conical taper surface 54, with regard to a vertical plane, is formed below the conical taper surface 54. A passage 66 is formed in the taper surface 56. This passage 66 opens into the sealed space formed between the O-rings 42 and 44 when the changer adapter 50 is fitted in the changer body 10. The passage 66 communicates with the outside of the changer adapter 50 through a passage 70. The pressurized fluid supplied from the inlet port 46 of the changer body 10 through the passages 66 and 70 can be used for operating the robot hand 74 attached to the changer adapter 50. A cavity 68 defined by a conical taper surface 72, of a taper less inclined than that of the conical taper surface 52, formed below the conical taper surface 52 is formed inside the changer adapter 50 so that the changer adapter 50 is fitted in the space between the head 18 and the retainer 16 formed in the changer body 10. An axial hole 76 formed in the flange of the changer adapter 50 is a positioning hole which snugly receives the positioning pin 24 fixed to the head 18 of the changer body 10 so that the changer adapter 50 engages the changer body 10 in a fixed circumferential positional relationship.

The operation of the hand changing device of the present invention, including the changer body 10 and the changer adapter 50 having the forms and the constructions as described hereinbefore will be described hereinafter.

As mentioned above, the changer body 10 is attached fixedly at the end face 10a thereof to the extremity of the robot arm of an industrial robot. A plurality of the changer adapters 50 are attached to various kinds of robot hands 74 having different operational functions, respectively, and are arranged and stored at fixed positions respectively. That is, a plurality of the changer adapters 50 corresponding to the necessary number of robot hands 74 are prepared.

In attaching the changer adapter 50 carrying the robot hand 74 to the changer body 10, the changer body 10 is brought through a robot action to the changer adapter 50 disposed beforehand at a fixed position. Before the changer body 10 is joined to the changer adapter 50, the pressurized fluid is supplied through the pressurized fluid inlet port 28a into the upper chamber 26a, and thereby the piston 20 is retained at the lower position against the upward pressure of the spring 22. When the changer body 10 is pressed against the changer adapter 50 with the positioning pin 24 thereof aligned with the positioning hole 76 of the changer adapter 50, the changer body 10 is engaged with the changer adapter 50. When the changer body 10 and the changer adapter 50 are engaged, the conical taper surface 34 of the changer body 10 is tightly engaged with the conical taper surface 54 of the changer adapter 50, and the clamping balls 14 are located adjacently to the conical taper surface 52. However, the clamping balls 14 are still movable in the retainer 16. Then, the supply of the pressurized fluid into the upper chamber 26a of the cylinder chamber 26 is interrupted and the pressurized fluid is supplied through the pressurized fluid inlet port 28b into the lower chamber 26b, whereby the piston 20 is moved upward by the pressure of the pressurized fluid and the upward pressure of the spring 22. Consequently, the clamping balls 14 are pushed outward so as to protrude from the retainer 16 to the clamping position, where the clamping balls 14 are pressed against the conical taper surface 52 of the changer adapter 50. Therefore, the conical taper surface 34 of the changer body 10 and the conical taper surface 54 of the changer adapter 50 are brought into precise and close contact with each other by the clamping force of the clamping balls 14, whereby the changer body 10 and the changer adapter 50 are firmly fitted together. Thus, the robot hand 74 attached to the changer adapter 50 is mounted on the extremity of the robot arm.

When it is necessary to remove the robot hand 74 thus mounted on the robot arm from the changer body 10, to replace the robot hand with another robot hand 74, the changer adapter 50 is brought by a robot action to a position where the changer adapter 50 is allowed to be engaged with a suitable holder provided on a suitable robot hand rack, not shown. Then, the supply of the pressurized fluid into the lower chamber 26b of the cylinder chamber 26 of the changer adapter 10 is interrupted and the pressurized fluid is supplied to the upper chamber 26a, whereby the piston 20 is moved downward against the upward pressure of the spring 22. Consequently, the clamping balls 14 become movable in the retainer 16, and hence the conical taper surface 54 of the changer adapter 50 is released from the conical taper surface 34 of the changer body 10. Then, the changer body 10 is pulled by a robot action and is disengaged from the changer adapter 50. Thus the robot hand 74 attached to the changer adapter 50 is removed from the extremity of the robot arm. Thereafter, the changer body 10 and another changer adapter 50 carrying a desired robot hand 74 are fitted together in the same manner as described hereinbefore to complete the robot hand changing operation.

FIG. 2 is a view showing the mode of attachment of the changer body 10 of the hand changing device of the present invention to the extremity of the robot arm of an industrial robot, in which the changer body 10 is mounted through a shock-absorbing spring mechanism 80 and a safety coupling mechanism 90 on a robot wrist 94 provided at the extremity of the robot arm 92. Indicated at 96 is a solenoid valve for controlling the pressurized fluid. Pipes 98 and 99 for supplying the pressurized fluid to operate the piston 20 of the hand changing device and a pipe 100 for supplying the pressurized fluid to operate the robot hand are extended from the solenoid valve 96.

It is apparent from the description given hereinbefore that the present invention provides a hand changing device capable of attaching automatically a robot hand selected from the robot hands of different working functions to the extremity of the robot arm of an industrial robot and of automatically replacing the robot hand attached to the robot arm with another. Accordingly, the previous preparation of various robot hands enables a single industrial robot to carry out various works, and thereby the working capacity and the functions of the industrial robot are expanded and consequently the efficiency of work using an industrial robot, such as transferring work and assembling work, is improved.

We claim:

1. A hand changing device for industrial robots, comprising a changer body for attachment to the robot arm of an industrial robot, and a changer adapter carrying a robot hand and designed to be coupled detachably with the changer body, wherein said changer body includes a double-acting fluid-operated linearly movable piston means, means for supplying pressure fluid to the opposite sides of said piston means for moving said piston means in opposite directions, a plurality of clamping balls mounted in a fixed retainer and movable radially outwardly and radially inwardly in said retainer for clamping and unclamping said changer adapter in said changer body, means on said linearly movable piston means for moving said clamping balls outwardly to a clamping position by the upward movement of said linearly movable piston means when said piston means is moved in a first direction and for moving said clamping balls inwardly into an unclamping position by the downward movement of said linearly movable piston means when said piston means is moved in an opposite direction and spring means applying upward pressure constantly to said linearly movable piston means for moving said clamping balls outwardly when said fluid pressure is released from said opposite sides of said piston means, said changer adapter having a mounting surface to which the robot hand is attached and a clamping ball engaging means, and the robot hand is replaced by replacing the changer adapter.

2. A hand changing device for industrial robots, according to claim 1, wherein said double-acting linearly movable piston means includes a piston having an upper pressure receiving surface and a lower pressure receiving surface for moving said piston up and down, the pressure of a pressurized fluid is applied alternately to said pressure receiving surfaces.

3. A hand changing device for industrial robots, according to claim 2, wherein said changer body has two cylinder chambers, divided by said linearly movable piston means and said pressurized fluid is introduced alternately into said two cylinder chambers.

4. A hand changing device for industrial robots, according to claim 1, wherein a plurality of said clamping balls are retained radially movably by said retainer disposed fixedly within said changer body.

5. A hand changing device for industrial robots, according to claim 4, wherein said linearly movable piston means has at one end thereof a ball receiving groove for receiving said clamping balls when said clamping balls are moved to the unclamping position and a conical surface expanding from the bottom of said ball receiving groove downward, said conical surface forces said clamping balls outwardly to the clamping position as the linearly movable piston moves upward.

6. A hand changing device for industrial robots, according to claim 1, wherein said changer adapter is a hollow annular member having an annular internal taper surface for receiving said balls.

7. A hand changing device for industrial robots, according to claim 6, wherein said changer adapter has in the upper portion of said hollow annular members, an engaging part for engaging said changer body.

8. A hand changing device for industrial robots, according to claim 1, wherein said changer body is provided with a positioning pin and a positioning hole for fittingly receiving the positioning pin is formed in said changer adapter.

* * * * *